2,802,722

PREPARATION OF MONOPERSULFATES

Stephen E. Stephanou, Lewiston, N. Y., assignor to E. I. du Pont de Nemours and Company, Wilmington, Del., a corporation of Delaware No Drawing. Application December 20, 1954, Serial No. 476,607

12 Claims. (Cl. 23—114)

This invention relates to the preparation of monopersulfates of metals, the monopersulfates of the alkali and alkaline earth metals in particular.

The monopersulfates are the salts of Caro's acid, $H_2SO_5$. Although there are two hydrogen atoms in a molecule of this acid, only one seems to be readily replaceable by a metal. Consequently, the monobasic salts alone have been characterized. Few preparations have heretofore been available for making monopersulfates and these few have been practiced on a small scale. Mellor: A Comprehensive Treatise on Inorganic and Theoretical Chemistry, vol. X, pp. 482–485 (1930), illustrates some of the known preparations.

In the known prior art processes, a solution containing monopersulfuric acid is simply reacted with an alkaline compound without any particular regard being paid to conditions obtaining. Data on yields obtained from such processes are very scant. Tests indicate, however, that the yields have been quite low and that the percentage of active oxygen recovered has also been low. Since active oxygen is particularly important where the material is to be used as an oxidizing agent, a low active oxygen content considerably impairs the utility of the product.

Active oxygen, as the term is utilized throughout this specification, is the oxygen in the molecule in excess of that required to form the corresponding bisulfate. It may be expressed as a percentage, utilizing potassium monopersulfate as an example, from the equation for the decomposition of the compound, $$KHSO_5 \rightarrow KHSO_4 + [O]$$

as follows:

$$\text{Percent active oxygen} = \frac{\text{Wt. of [O]}}{\text{Wt. of KHSO}_5} \times 100$$

The symbol [O] represents the active oxygen itself, available for the formation of free oxygen or the oxidation of materials like potassium iodide, capable of being oxidized.

An object of the present invention is, therefore, provision of an improved method of preparing monopersulfates. Another object of the invention is provision of a method for preparing monopersulfates in a maximum yield. Yet another object is provision of a method for preparing monopersulfates with improved recovery of active oxygen. A further object of the invention is preparation of certain monopersulfates not made heretofore.

The above-mentioned and still further objects may be achieved in accordance with this invention by a process in which monopersulfuric acid is carefully "neutralized" to a pH not greater than about 3 and the resulting solution filtered and evaporated to dryness. The acidity at which the neutralization is accomplished is critical since at pH values much above 3 decomposition occurs in the solution with the formation of a bisulfate and substantial loss of active oxygen. In addition, unstable products are obtained and the recovery of active oxygen is much impaired.

A general equation for the decomposition of a monopersulfate at a pH greater than around 3 may be written as:

$$M(HSO_5)_x \rightarrow M(HSO_4)_x + x/2 \uparrow O_2$$

where M is a metal such as sodium, potassium, calcium, barium, or the like and $x$ is the valence of the metal, i. e., 1 or 2. Aluminum, zinc and ammonium monopersulfates are also subject to decomposition in the manner described. The formation of the acid sulfate or bisulfate according to the equation given will automatically lower the pH until stable conditions are again reached. The stability is, however, achieved at the expense of active oxygen.

The monopersulfuric acid utilized may be derived from any convenient source. Material obtained by electrolysis of sulfuric to dipersulfuric acid and hydrolysis of the latter to monopersulfuric acid is satisfactory. High concentrations of monopersulfuric acid can also be obtained by reacting concentrated hydrogen peroxide with oleum or concentrated sulfuric acid. In either case, monopersulfuric acid containing a minimum of sulfuric acid is preferred.

The compound chosen to neutralize the acid will, in general, be a hydroxide or an alkaline salt of the metal concerned. Monopersulfates of sodium, potassium, magnesium, calcium and the like may readily be formed from the respective hydroxide as described. Aluminum and zinc hydroxides may also be used. The preferred compound is, however, the carbonate of the desired metal since it introduces no undesired ion, carbonate being removed as carbon dioxide. The carbonate or other alkaline compound selected may be utilized in the form of an aqueous solution, as a slurry or as a solid. Although the concentration of the neutralizing solution employed is not critical, saturated solutions are preferred to keep the volume of water as low as possible. If the metal forms a relatively insoluble sulfate such as $Na_2SO_4 \cdot 10H_2O$ or $K_2SO_4$, the latter can be removed by filtration and a less impure monopersulfate obtained.

The temperature of the neutralization is of some importance. High temperatures result in the loss of active oxygen: consequently, the maximum utilized should be no higher than about 40° C. Temperatures as low as −5 or −10° C. can be utilized to advantage. An optimum reaction temperature is, in fact, between about −10° C. and +10° C.

The invention will be understood in more detail from the examples which follow. In these examples, all percentages are by weight and all neutralizations were carried out at about 0–10° C. and ambient pressure unless otherwise noted.

Example 1

This example shows the preparation of solid potassium monopersulfate, $KHSO_5$, according to a standard method described in Mellor, loc. cit., without regard to the pH finally reached and is included as a control.

*a.* One hundred grams of C. P. potassium persulfate was added gradually with stirring to 204 g. (1.98 moles) of ice-cold concentrated sulfuric acid. The resulting slurry was poured into a mixture containing 273 g. (1.98 moles) of potassium carbonate and 600 g. of water and ice and the product filtered. The carbonate used was sufficient to neutralize all the sulfuric acid initially present. Analysis of the filtrate showed the presence of 2% by weight of potassium and monopersulfate. Potassium carbonate was added to the filtrate until effervescence ceased. The mixture was then filtered again and the filtrate evaporated in a vacuum desiccator over concentrated sulfuric acid.

The following day the crystals which had formed were filtered and the filtrate treated with additional potassium carbonate. Analysis of the filtrate indicated 8% $KHSO_5$. After further drying in the vacuum desiccator and repeated crystallization and filtration as well as treatment with potassium carbonate after each filtration, a dry product was finally obtained which contained 21% $KHSO_5$, a percentage corresponding to 2.3% active oxygen. The purity of potassium monopersulfate obtained was less than 50% of theoretical while the recovery of active oxygen was less than 20%. Storage of this material at room temperature resulted in a loss of half of the active oxygen within 8 days.

b. Four hundred grams of a solution containing 15% monopersulfuric acid and 20% sulfuric acid were adjusted to a pH of 6 with 10% $Na_2CO_3$ solution. After considerable loss of active oxygen, a final concentration of 2.5% sodium monopersulfate was reached. This low figure may be contrasted with the 17% sodium monopersulfate obtained when neutralization is to a pH of 2. Attempts to concentrate the 2.5% solution by vacuum evaporation at 35° C. followed by drying at higher temperature resulted in complete loss of active oxygen.

c. A solution containing 63% monopersulfuric acid and 21% sulfuric acid was neutralized with 50% potassium carbonate to pH 8. The resulting mixture was filtered and the filtrate spray dried. The resulting dry powder was found to contain no active oxygen and hence, no monopersulfate.

Example 2

This example shows the formation of potassium monopersulfate by the methods of this invention.

a. An aqueous solution containing initially 63% of monopersulfuric acid and 20% of persulfuric acid was neutralized to pH 2 with 50% potassium carbonate solution. The active oxygen present in the resulting slurry was 99% of the original. The slurry was dried to give a stable product containing 60% $KHSO_5$, the remainder consisting essentially of potassium sulfate and potassium acid sulfate. The over-all recovery of active oxygen was 95%. This product lost less than 3% of its active oxygen upon standing at room temperature for two weeks.

b. A mixture containing initially 60.4% of monopersulfuric acid and 21% of sulfuric acid was neutralized with 50% potassium carbonate to pH 2. A portion of the resulting slurry was dried to give a product containing 55% of $KHSO_5$ with an over-all active oxgen recovery of 96%.

Another portion of the slurry was filtered and the filtrate dried to give a product containing 6.8% active oxygen. Upon standing in a vented bottle at room temperature, this material lost about 5% of its active oxygen in three months and 30% in 15 months.

c. A mixture containing 20% monopersulfuric and 19% sulfuric acid was neutralized to pH 2.5 with $K_2CO_3$ solution and the potassium sulfate filtered off. 90% of the active oxygen appeared as potassium monopersulfate in the filtrate. Drying the filtrate gave a stable product containing 6.5% active oxygen and a recovery of 92% of the active oxygen in the drying step.

d. A mixture containing 22% sulfuric acid and 63% monopersulfuric acid was neutralized to pH 2.0 with 50% potassium carbonate solution and potassium sulfate filtered off. 90% of the active oxygen initially present appeared as potassium monopersulfate in the filtrate. Drying the filtrate gave a stable product containing 7.70% active oxygen (73.2% potassium monopersulfate). Over-all active oxygen recovery in the neutralization and drying step was 89%.

Example 3

This example shows the production of sodium monopersulfate by the methods of this invention.

An aqueous solution containing 17% monopersulfuric acid and 23% sulfuric acid was neutralized with a 28% sodium carbonate solution to pH 2.9. The precipitated Glauber's salt, $Na_2SO_4 \cdot 10H_2O$, was removed by filtration. 85% of the total active oxygen was recovered in the filtrate as sodium monopersulfate. The filtrate was dried to yield a product containing 5.1% active oxygen. Recovery of active oxygen in the drying step was 93%.

Example 4

This example shows the preparation of ammonium monopersulfate.

A solution containing 20% monopersulfuric and 19% sulfuric acid was neutralized with solid ammonium carbonate to pH 2.9. The resulting solution was evaporated to give a dry stable product containing 5.0% active oxygen present as ammonium monopersulfate, $NH_4HSO_5$. The over-all recovery of active oxygen was 85%. Upon standing for two weeks at 32° C., this product lost less than 3% of its active oxygen content.

Example 5

This example shows the preparation of calcium monopersulfate.

An aqueous solution containing 48% monopersulfuric acid and 23% sulfuric acid was neutralized with solid calcium carbonate to pH 1.9. Removal of the precipitated calcium sulfate by filtration left a filtrate containing 85% of the active oxygen as calcium monopersulfate. The filtrate was evaporated in vacuo to give a product containing 83% calcium monopersulfate.

Example 6

This example shows the preparation of magnesium monopersulfate.

A solution containing 13.6% monopersulfuric and 20% sulfuric acid was reacted with solid basic magnesium carbonate to pH 1.2. Removal of magnesium sulfate by filtration and evaporation of the filtrate gave a product containing 69% magnesium monopersulfate.

Example 7

This example shows the preparation of aluminum monopersulfate.

A slurry of freshly precipitated aluminum hydroxide was added to a 10% solution of monopersulfuric acid. Solid barium carbonate was added to bring the pH of the solution up to 2.5. Insoluble barium sulfate was filtered off and the filtrate evaporated to dryness. The product contained 5.6% active oxygen.

Example 8

This example shows the preparation of zinc monopersulfate.

A slurry of freshly precipitated zinc hydroxide was added to a 10% solution of monopersulfuric acid. Solid barium carbonate was added to adjust the pH to 1.5 and insoluble barium sulfate filtered off. Evaporation of the filtrate gave a product containing 4.2% active oxygen.

Having described my invention, I claim:

1. A method of producing a solid monopersulfate comprising reacting at a temperature not exceeding about 40° C. an aqueous solution of monopersulfuric acid and a compound of the group consisting of: (1) sodium, potassium, calcium, barium, zinc, aluminum and ammonium hydroxides and (2) the carbonates corresponding to said hydroxides, said solution and said compound being employed in such proportions that the mixture resulting from the reaction has a pH not greater than 3, and recovering a solid monopersulfate from said mixture without first adding to said mixture any material which will cause the pH of the mixture to exceed 3.

2. The method of claim 1 wherein the compound reacted with the solution of monopersulfuric acid is a carbonate and the reaction is carried out at a temperature in the range −10° to +40° C.

3. The method of claim 2 wherein the carbonate is employed in the form of a solid.

4. The method of claim 2 wherein the carbonate is employed in the form of an aqueous solution.

5. A method of producing solid sodium monopersulfate comprising reacting at a temperature not above about 40° C. aqueous monopersulfuric acid and sodium carbonate, said acid and said carbonate being employed in such proportions that the resulting mixture has a pH not greater than 3, and recovering solid sodium monopersulfate from said mixture without first adding to said mixture any material which will cause the pH of the mixture to exceed 3.

6. The method of claim 5 wherein Glauber's salt produced during the reaction is separated from the reaction mixture before recovering the product sodium monopersulfate.

7. A method of producing solid sodium monopersulfate comprising reacting at a temperature not above about 40° C. aqueous monopersulfuric acid and sodium hydroxide, said acid and said hydroxide being employed in such proportions that the resulting mixture has a pH not greater than 3, and recovering solid sodium monopersulfate from said mixture without first adding to said mixture any material which will cause the pH of the mixture to exceed 3.

8. A method of producing solid potassium monopersulfate comprising reacting at a temperature not above about 40° C. aqueous monopersulfuric acid and potassium carbonate, said acid and said carbonate being employed in such proportions that the resulting mixture has a pH not greater than 3, and recovering solid potassium monopersulfate from said mixture without first adding to said mixture any material which will cause the pH of the mixture to exceed 3.

9. A method of producing solid potassium monopersulfate comprising reacting at a temperature not above about 40° C. aqueous monopersulfuric acid and potassium hydroxide, said acid and said hydroxide being employed in such proportions that the resulting mixture has a pH not greater than 3, and recovering solid potassium monopersulfate from said mixture without first adding to said mixture any material which will cause the pH of the mixture to exceed 3.

10. A method of producing solid ammonium monopersulfate comprising reacting at a temperature not above about 40° C. aqueous monopersulfuric acid and ammonium carbonate, said acid and carbonate being employed in such proportions that the resulting mixture has a pH not greater than 3, and recovering solid ammonium monopersulfate from said mixture without first adding to said mixture any material which will cause the pH of the mixture to exceed 3.

11. A method of producing solid calcium monopersulfate comprising reacting at a temperature not above about 40° C. aqueous monopersulfuric acid and calcium carbonate, said acid and said carbonate being employed in such proportions that the resulting mixture has a pH not greater than 3, and recovering solid calcium monopersulfate from said mixture without first adding to said mixture any material which will cause the pH of the mixture to exceed 3.

12. A method of producing solid magnesium monopersulfate comprising reacting at a temperature not above about 40° C. aqueous monopersulfuric acid and magnesium carbonate, said acid and carbonate being employed in such proportions that the resulting mixture has a pH not greater than 3, and recovering solid magnesium monopersulfate from said mixture without first adding to said mixture any material which will cause the pH of the mixture to exceed 3.

References Cited in the file of this patent

Mellor: "A Comprehensive Treatise on Inorganic and Theoretical Chemistry," vol. X, pages 482–485 (1930), Longmans, Green and Co., New York, N. Y.